H. B. S. NORMAN.
WINDOW SHADE.
No. 10,015. Reissued Jan. 24, 1882.
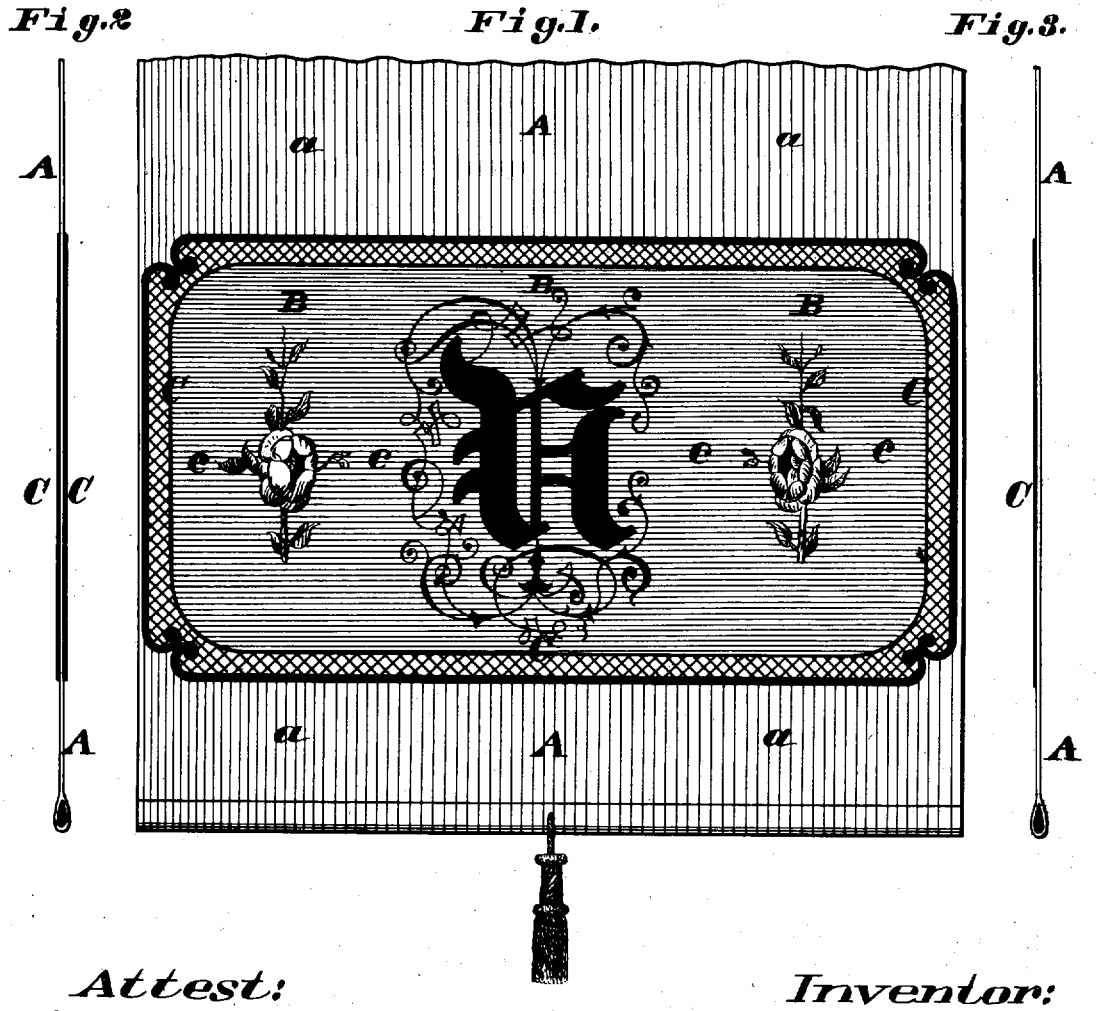
Attest:
Charles Pickles
Saml. S. Boyd
Inventor:
Hannah B. S. Norman
by C. D. Moody
atty

UNITED STATES PATENT OFFICE.

HANNAH B. S. NORMAN, OF ST. LOUIS, MISSOURI.

WINDOW-SHADE.

SPECIFICATION forming part of Reissued Letters Patent No. 10,015, dated January 24, 1882.

Original No. 247,394, dated September 20, 1881. Application for reissue filed December 9, 1881.

*To all whom it may concern:*

Be it known that I, HANNAH B. S. NORMAN, of St. Louis, Missouri, have made a new and useful Improvement in Window-Shades, of which the following is a full, clear, and exact description, reference being had to the annexed drawings, making part of this specification, in which—

Figure 1 is a side elevation of a portion of a window-shade having the improvement; Fig. 2, an edge elevation of the same; and Fig. 3, an edge elevation, showing the decoration applied to but one side of the shade.

The same letters denote the same parts.

The present invention relates to an improved mode of decorating window-shades.

Hitherto it has been customary in ornamenting a window-shade to print or paint the figures or designs composing the ornament directly onto the shade. The shade, however, by reason of the color usually thereupon, is opaque, and the ornamentation is visible upon that side only of the shade from which the light comes. Another mode of ornamenting is to print the figure onto translucent cloth, upon one side of the cloth, and then insert the printed cloth into the shade, the latter being divided to admit the ornamented cloth, which is attached to the shade by lapping its edges upon the abutting edges of the shade and then stitching the lapped edges. This last-named mode, while it renders the ornamented portion of the shade translucent, is objectionable. The shade is materially weakened. In raising and lowering the shade the seams which connect the inserted pieces with the upper and lower parts of the shade are strained and they are apt to part. The stitches of the seams in question are also rendered noticeably visible when the light shines through the shade, marring the effect of the ornament. Such a shade, also, when viewed from the reverse side to that which is ornamented, and lighted only by reflected light, as in the evening, looking from the room toward the shade, does not appear ornamented, the inserted cloth appearing simply in its natural color, and the outlines of the design not being visible.

To obviate the various objections named, and to provide means by which a window-shade can be readily ornamented upon one or both sides, at the same time rendering the shade translucent, but without weakening the shade, is my present aim, and is as follows:

The shade is made from a continuous piece of translucent cloth or paper. The design which it is intended to use is then printed or painted or produced upon translucent paper, cloth, or other thin, flexible, translucent material. This paper is then gummed to the shade, and at the point or points where it is desired to apply the ornamentation. If both sides of the shade are to be ornamented, the ornamented paper is applied to both sides of the shade, taking care that the designs respectively upon the two sides of the shade register or come exactly opposite each other, and so that the various lines and figures on one of the papers shall come opposite the corresponding lines and figures on the other paper, as in the annexed drawings, where A represents the continuous web of translucent cloth or paper constituting the body of the shade, and extending the length of the shade, or that portion covered by the ornamented paper.

The design or ornament (shown as the dado B) is printed or produced upon thin translucent paper C, paper for this purpose being used in preference to any other material. The ornamented paper C is then gummed to the web A.

In Fig. 2 the paper is shown applied to both sides of the web. In Fig. 3 it is applied to but one side.

The paper C serves to strengthen the web. No stitches are needed in attaching the paper C, and the shade appears ornamented, when the paper C is applied on both sides of the shade, in all positions, from the street, from within the room, and also when the light is not shining through the shade.

The web around the ornamented portion, as at *a a*, may be colored to render the shade at those points opaque, if desired. The portions *c c* of the shade—that is, all of the paper C which is not occupied by the design B—are translucent; or, what would be the equivalent, the desired effect might be produced by having the portions *c c* opaque and the design B translucent.

I claim—

1. A window-shade the body of which is a continuous web, A, and having mounted thereupon and upon one or both sides of the web, as desired, the translucent ornamented paper C, said web at the point or points where the ornamented paper is attached being translucent, substantially as described.

2. A window-shade any part of which having mounted thereupon and upon one or both sides of said part, as desired, ornamented paper or other thin, flexible, translucent material, said web at the point or points where the paper is attached being translucent.

3. A window-shade having ornamented paper or other thin, flexible, translucent material upon both sides thereof, the designs on said papers registering.

HANNAH B. S. NORMAN.

Witnesses:

C. D. MOODY,

JAS. NORMAN.